US010457614B1

(12) United States Patent
Watson

(10) Patent No.: US 10,457,614 B1
(45) Date of Patent: Oct. 29, 2019

(54) PORTABLE COMPOST RETENTION UNIT WITH REMOVABLE PARTITION

(71) Applicant: Steven E. Watson, Minneapolis, MN (US)

(72) Inventor: Steven E. Watson, Minneapolis, MN (US)

(*) Notice: Subject to any disclaimer, the term of this patent is extended or adjusted under 35 U.S.C. 154(b) by 197 days.

(21) Appl. No.: 15/416,935

(22) Filed: Jan. 26, 2017

(51) Int. Cl.
C05F 17/02 (2006.01)
C05F 9/02 (2006.01)
C05F 17/00 (2006.01)

(52) U.S. Cl.
CPC ............ C05F 17/0258 (2013.01); C05F 9/02 (2013.01); C05F 17/00 (2013.01); C05F 17/0205 (2013.01); C05F 17/027 (2013.01); C05F 17/0211 (2013.01)

(58) Field of Classification Search
CPC .... C05F 17/0205; Y02W 30/43; Y02P 20/145
See application file for complete search history.

(56) References Cited

U.S. PATENT DOCUMENTS

| | | |
|---|---|---|
| 2,654,498 A | 10/1953 | Jennison |
| 4,211,033 A | 7/1980 | Ringer |
| 4,832,222 A | 5/1989 | Storton |
| 4,848,585 A | 7/1989 | Snyder |
| 5,072,828 A | 12/1991 | Irvine |
| 5,392,906 A | 2/1995 | Taniyama |
| 6,019,239 A | 2/2000 | Watson |
| 6,843,385 B2 | 1/2005 | Gardi |
| 7,819,270 B1* | 10/2010 | Hughes ............... B65D 21/086 220/4.03 |
| 7,833,781 B2* | 11/2010 | Thurot .................... C05F 17/02 435/290.1 |
| 2002/0162840 A1 | 11/2002 | Tscudi |
| 2014/0246338 A1 | 9/2014 | Robby |

FOREIGN PATENT DOCUMENTS

WO    WO-2012/117408 A1    9/2012

OTHER PUBLICATIONS

Crockett, James Underwood; "The Composter, or the Brown Gold Cadillac"; in *Crockett's Victory Garden*; Little, Brown & Co. 1977; pp. 182-183.

* cited by examiner

*Primary Examiner* — Gautam Prakash
(74) *Attorney, Agent, or Firm* — Robert C. Feed; Dykema Gossett PLLC

(57) ABSTRACT

A compost retention unit with removable partition is provided. The compost retention unit includes mesh retention material secured to interconnected frame structures such that the mesh retention material and the plurality of frame structures can cooperate to retain compost within the unit when the unit is fully assembled upon a generally flat surface. The removable partition can be secured to provide separate enclosures, and can be removed to facilitate transfer or turning of the compost. Preferably, the compost retention unit can be collapsed for storage or shipment and expanded to assemble the retention unit for use. Preferably the compost retention unit includes three rectangular frame structures which pivot to assemble the compost retention unit for use. Most preferably, the frame structures are made of four lengths of wooden "two-by-four" or "two-by-six" framing materials, and the mesh retention material is preferably a wire mesh material.

20 Claims, 15 Drawing Sheets

PORTABLE COMPOST RETENTION UNIT WITH REMOVABLE PARTITION

BACKGROUND

Field of the Invention

The present invention relates to a retention unit for retaining materials such as leaves and other compostable natural materials ("compost") for sufficient time to allow the materials to begin to "compost" or degrade structurally. The present unit relates specifically to portable units which fold together for shipment and storage, and unfold for assembly into a standing retention unit.

The unit described below is designed to control and recycle organic wastes effectively within an urban environment, is intended for use by individual property or homeowners and is commonly referred to as a compost box, compost unit or composter.

BACKGROUND

It will be appreciated that compost units are difficult to conveniently build or assemble from "scratch", and that the expense in having one built by others, or the time involved in building one are significant. Therefore, there is a long felt need for a compost unit which is functional, easy to mass produce and ship, and easy to assemble.

It will also be appreciated that in the typical practice of composting, transfer or "turning" of the compost pile from one bin to another bin, with the rotation of material from the top of the pile in the first bin to the bottom of the pile in the next bin, is used to accelerate the process of composting organic material. This process of transferring and turning the compost pile can be difficult, requiring significant physical exertion.

The present invention addresses these and other problems associated with prior art composting technologies and also offers other advantages over the prior art, solving other problems associated therewith.

SUMMARY OF THE INVENTION

In accordance with the present invention a compost retention unit is provided. The compost retention unit comprises mesh retention material secured to a plurality of interconnected frame structures such that the mesh retention material and the plurality of frame structures can cooperate to retain compost within the unit when the unit is fully assembled upon a generally flat surface. In preferred embodiments, a first frame structure can pivot with respect to a second frame structure when the unit is being assembled; in some embodiments, the first frame structure pivots 180 degrees with respect to the second frame structure.

In preferred embodiments, the compost retention unit can be divided into a plurality of separate enclosures by insertion of a removable partition into the compost retention unit. The compost retention unit retains compost, compostable organic material, or other retained material that is placed into one or more enclosures of the compost retention unit. The removable partition includes a mesh retention material, and can be easily removed when it is desired to transfer or "turn" the compost pile. Preferably, the compost pile is turned as the pile of organic material is transferred from one portion of the compost retention unit to another portion of the compost retention unit, facilitated by removal of the removable partition.

In preferred embodiments, the removable partition is rectangular, and can be flipped top-to-bottom and inserted into the compost retention unit either way. More preferably, the removable partition is square, and can be rotated and inserted into the compost retention unit with any of the four sides oriented down. Preferably, the removable partition can be flipped so that either face is oriented towards either of the adjacent separate enclosures separated by the removable partition.

Preferably, the removable partition slides into at least one lower retention member to secure the removable partition in the compost retention unit. Preferably, at least one upper retention member secures the removable partition in the compost retention unit, preventing the removable partition from tilting out of position when the upper retention member is in place, and allowing the removable partition to tilt to one side for removal when the upper retention member is disengaged.

In situations in which the compost retention unit does not need to collapse for shipment or storage, the frame structures may not necessarily pivot with respect to each other, but the compost retention unit still comprises a removable partition to facilitate transfer and turning of the compost pile.

The invention also includes methods of composting organic material, with preferred methods including the steps of providing a portable compost retention unit having a folding outer frame and a center frame and a removable partition, unfolding the outer frame to an expanded configuration, securing the removable partition to the center frame to create separate enclosures in adjacent portions of the compost retention unit, placing compostable organic material in one of the separate enclosures, removing the removable partition from the center frame, transferring the organic material to the adjacent portion of the compost retention unit, and replacing the removable partition and securing the removable partition to the center frame. In further preferred methods, the removable partition is rectangular, and is flipped end-for-end when the removable partition is replaced in the center frame. In still further preferred methods, the removable partition is square, having four equal sides, and is rotated to orient a different side downward when the removable partition is replaced in the center frame.

The present retention unit has many advantages over the prior art compost units. Among these advantages are ease of assembly, ease of shipping and storage prior to assembly, ease of packaging prior to shipping, its relatively light weight, mobility, portability, cost, and the lack of need to anchor the unit. The ease of access to compost retained in the unit and the multiple strategies for processing compost material within a multiple-bin structure are also advantages.

Preferably, the retention unit is easily assembled through a simple, three-step process involving separation and rotation of frame structures which are pivotably interconnected, fastening of a rear screen, and placement of containment slats. In preferred embodiments, prior to assembly, the portable compost retention unit occupies a minimal space: collapsed, it is approximately one foot wide, and can be moved and manipulated easily prior to assembly. In these preferred embodiments, minimal space is needed for shipping and storage of the retention unit, but the retention unit extends such as to about six feet in length when assembled, thereby accommodating a much greater volume of organic material (which also maximizes the primary composting process, bacterial decomposition) over prior art composting technologies.

The preferred embodiment also utilizes removable containment slats which allow easy access to the organic material. Preferably, a system of internal wires restricts movement of the containment slats, thereby decreasing the overall weight and cost of materials in comparison to prior art composting technologies.

The above-described features and advantages along with various other advantages and features of novelty are pointed out with particularity in the claims of the present invention. However, for a better understanding of the invention, its advantages, and object attained by its use, references should be made to the drawings which form a further part of the present application and to the accompanying descriptive matter in which there is illustrated and described preferred embodiments of the present invention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof, wherein:

FIG. 2 is a perspective view from the back side depicting the unfolding of the prior art portable compost retention unit of FIG. 1a;

FIG. 5a is a perspective view from the front of the fully-assembled prior art portable compost retention unit of FIG. 1a;

FIGS. 5b, 5c and 5d each show a side view of containment slats 22b, 22a and 22, respectively, of the prior art portable compost retention unit of FIG. 1a;

DETAILED DESCRIPTION

Figure 1A:
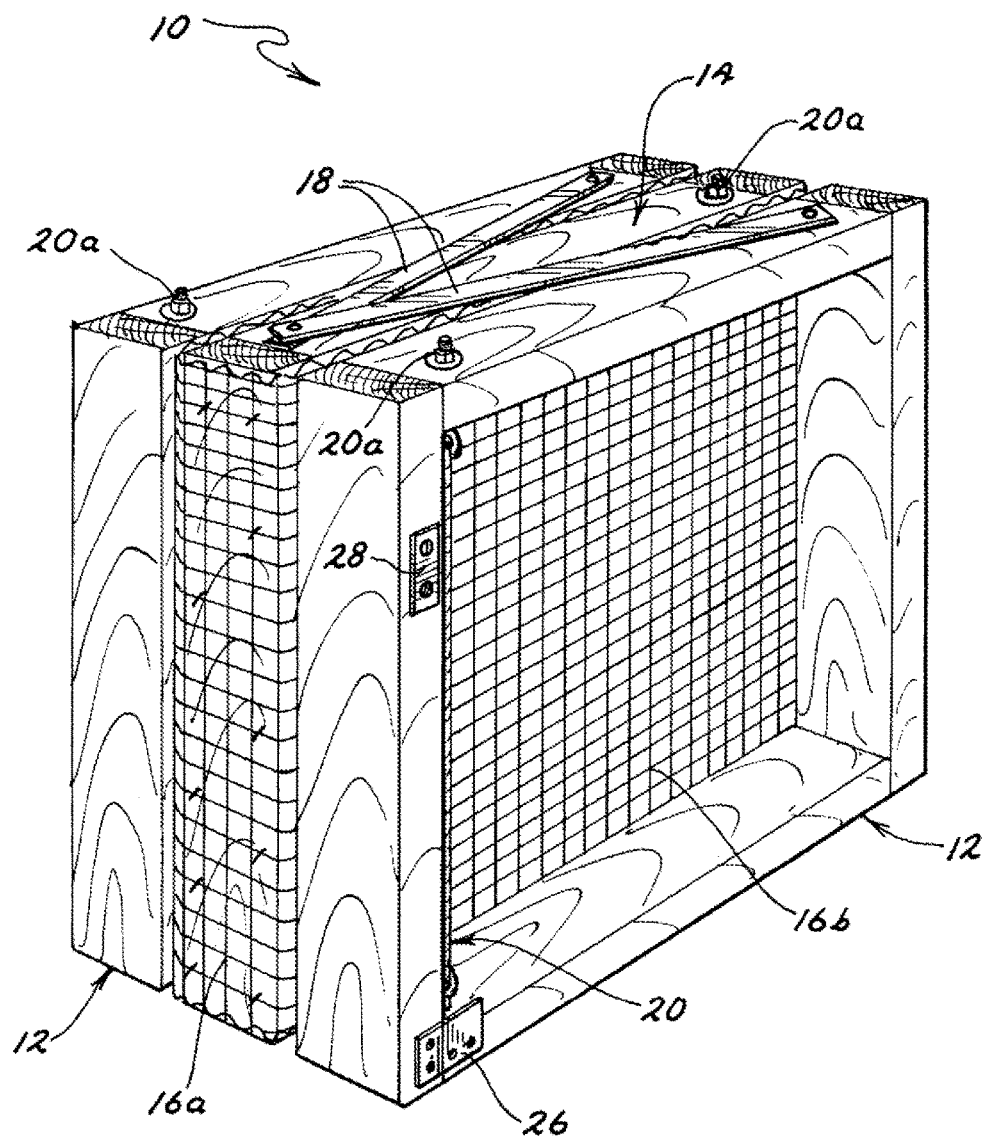
FIG. 1a is a perspective view generally from the back side and somewhat to one side, of a prior art portable compost retention unit, shown in a collapsed configuration.

Referring now to the drawings, FIGS. 1-7 show a prior art portable compost retention unit 10, and FIGS. 8-14 illustrate the present portable compost retention unit with removable partition 110. The prior art portable compost retention unit 10 of FIGS. 1-7 is shown to illustrate an example of folding up and unfolding of a portable compost retention unit as well as to show differences between the prior art and the present invention.

Figure 1B:
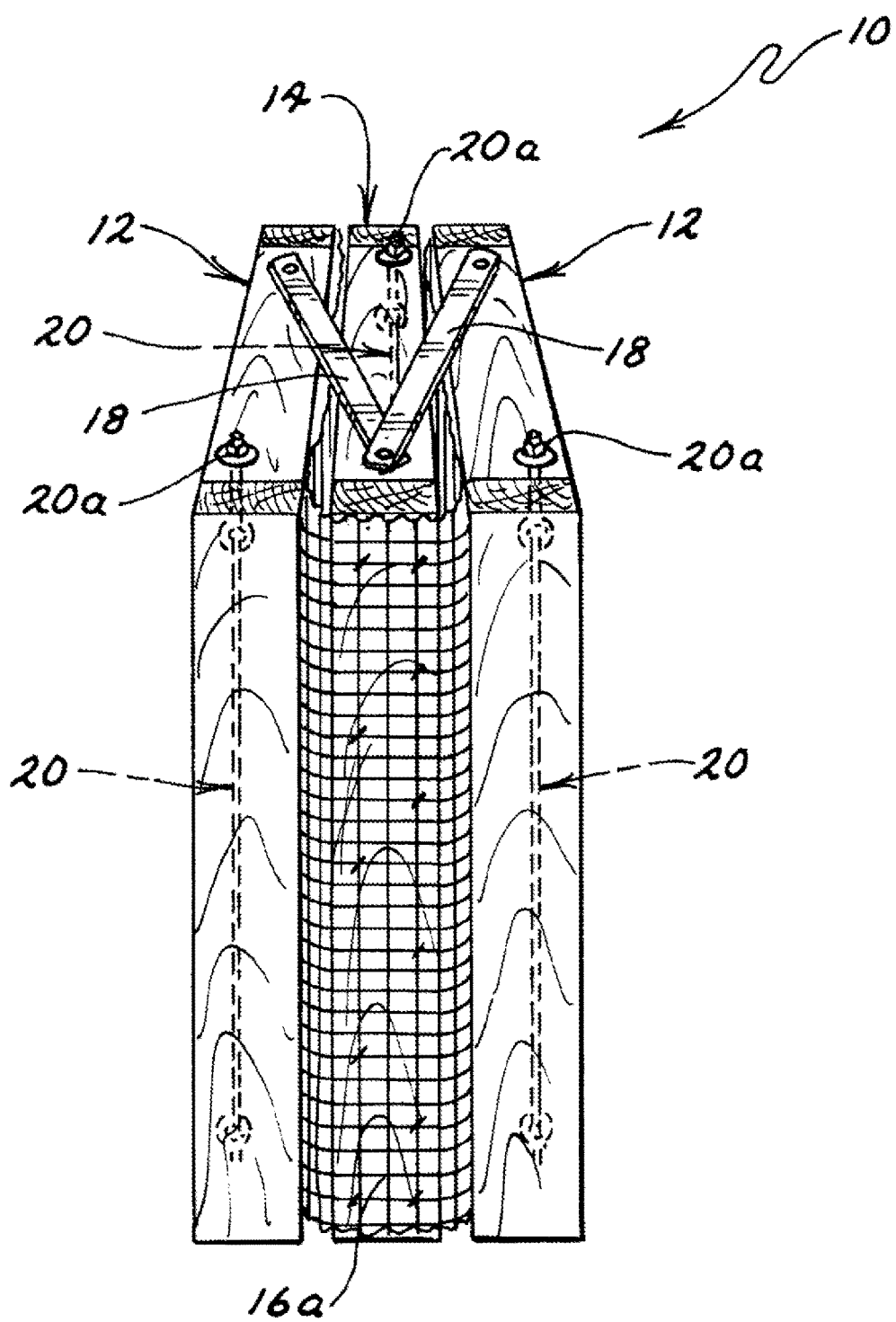
FIG. 1b is a perspective view generally from the back side, of the prior art portable compost retention unit of FIG. 1a, shown in a collapsed configuration.
Figure 2:
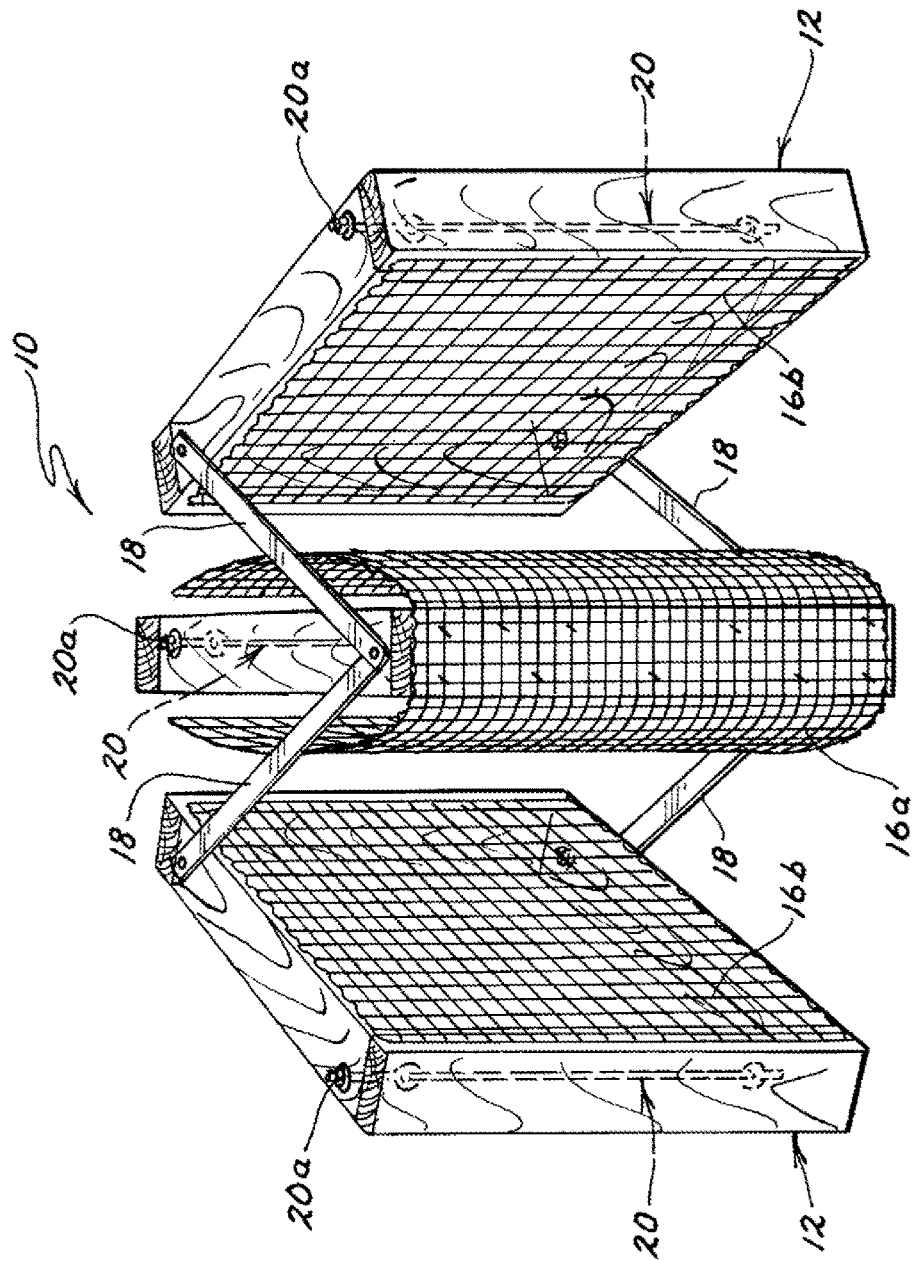

Referring now to FIGS. 1a-7, there is illustrated a prior art portable compost retention unit 10 (also referred to herein as the retention unit 10). FIGS. 1a, 1b and 2 show the partially assembled retention unit 10 in collapsed form, including two outer frame structures 12, an interconnected center frame structure 14, and mesh retention material 16a, 16b, 16c. Frame structures 12 and 14 are pivotally attached to cross braces 18 on the top and bottom of the retention unit 10.

As illustrated in FIGS. 1a and 1b, prior to assembly, the mesh retention material 16a is enclosed within the retention unit 10 and connected to center frame structure 14. Mesh retention material 16b covers the opening of outer frame structures 12 completely, while mesh retention material 16c is offset, leaving center frame structure 14 partially open to accommodate placement of containment slats 22 on the inside of frame structures 12 and 14. Frame structures 12 and 14 also include an internal wire restraint 20 located on the opposite side from attachment to cross brace 18. An adjustment nut 20a engages wire restraint 20 and protrudes above frame structure 12 and 14 to allow for adjustment of tension on internal wire restraints 20.

Figure 3:
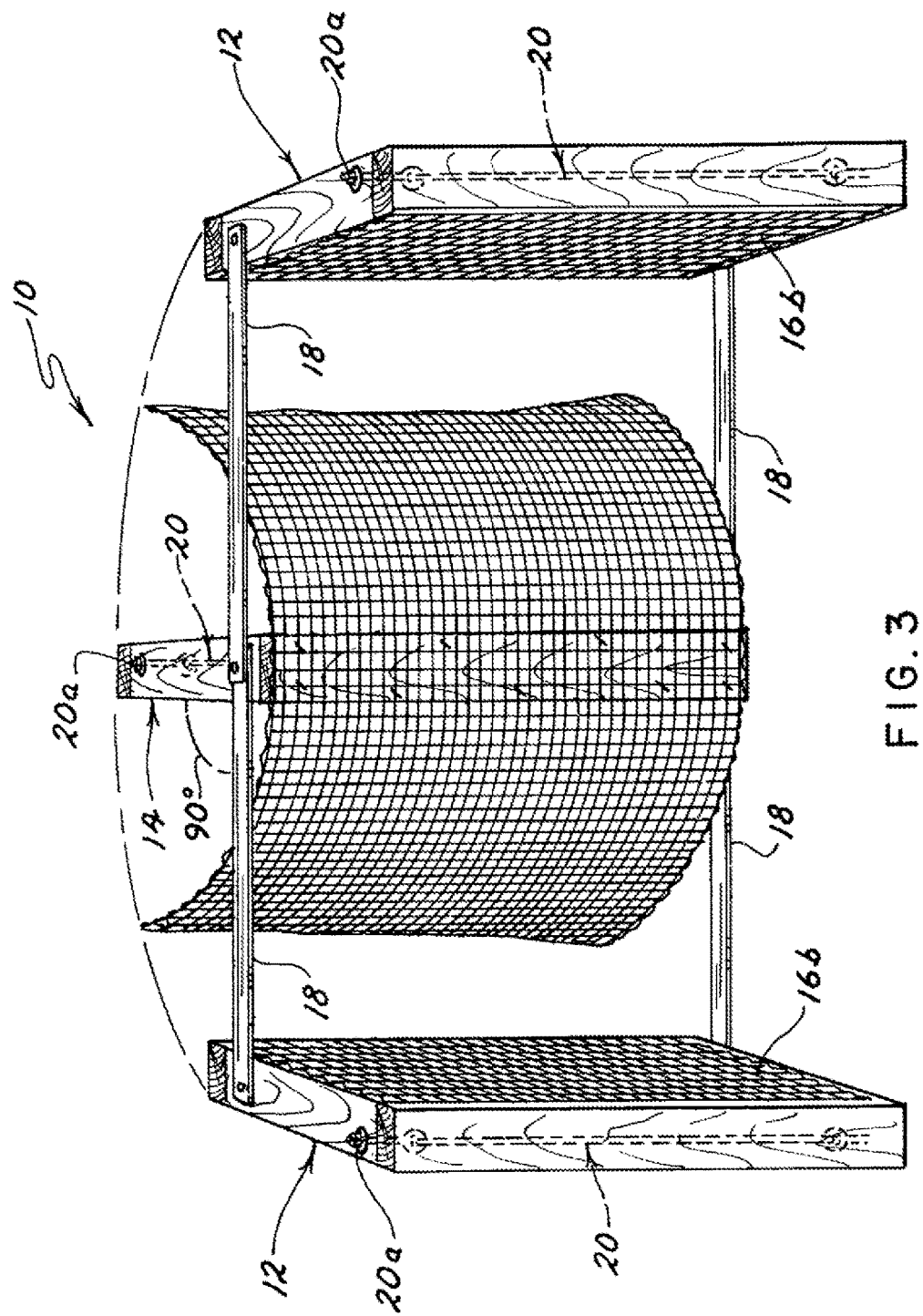
FIG. 3 is a perspective view from the back side of the prior art portable compost retention unit of FIG. 1a, shown in a fully extended configuration.
Figure 4:
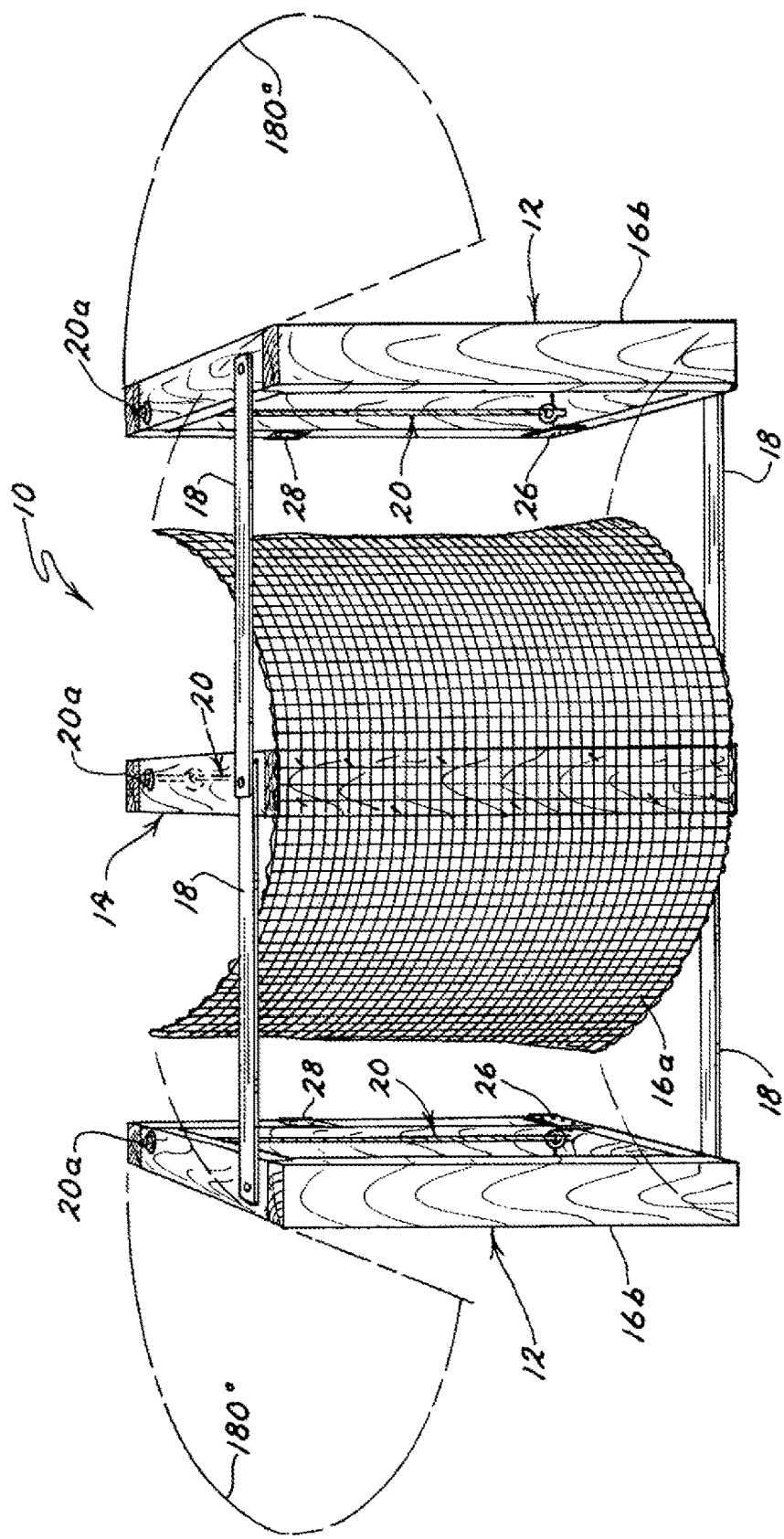
FIG. 4 is a perspective view from the back side of the prior art portable compost retention unit of FIG. 1a, shown in position for final assembly.
Figure 5A:
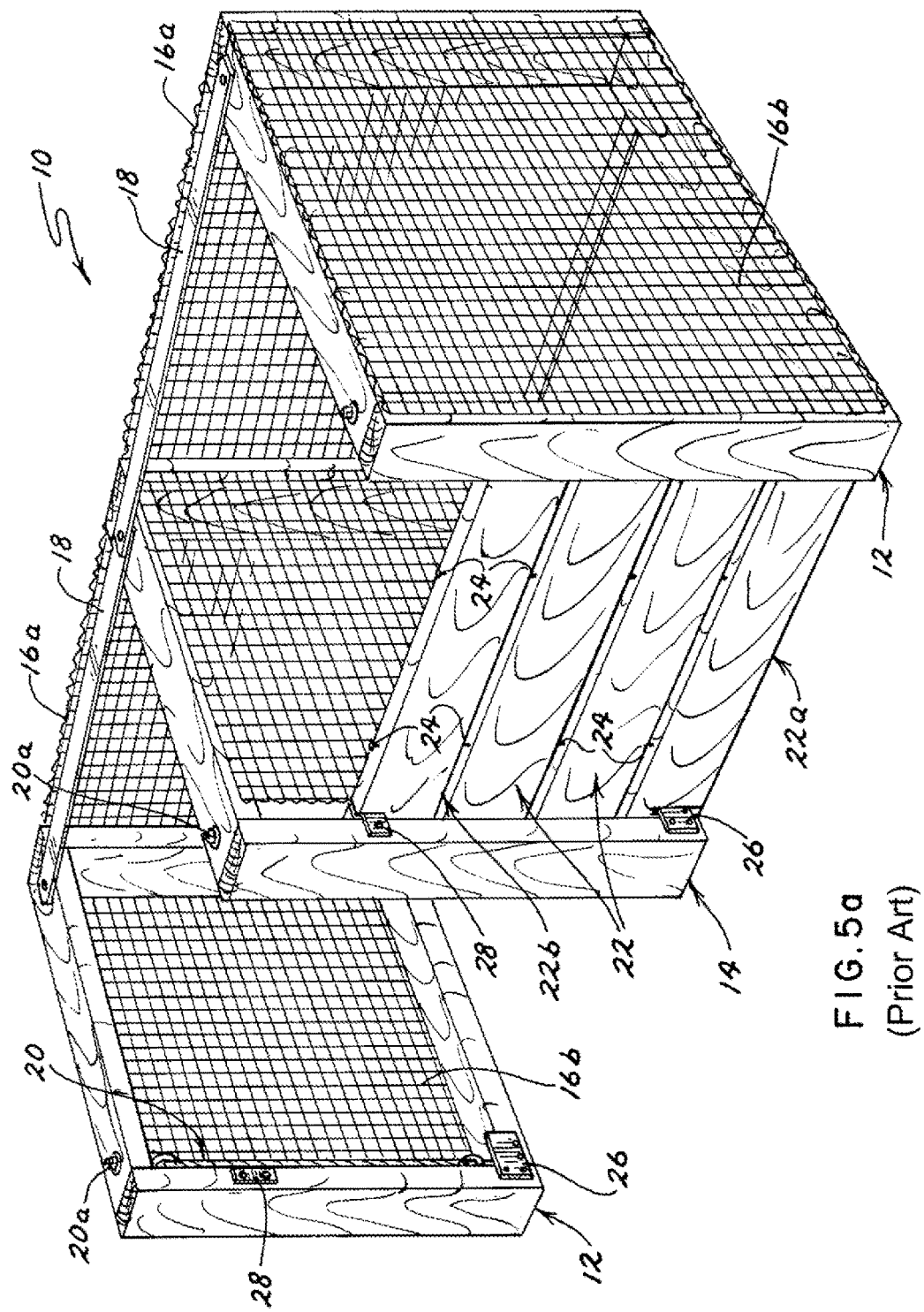
Figure 5B:
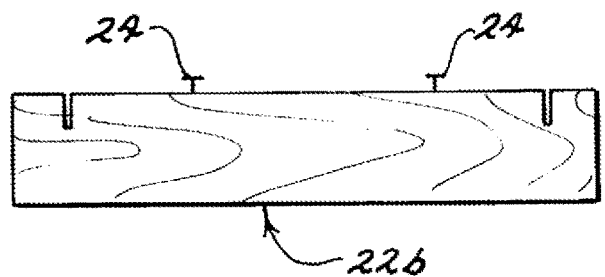
Figure 5D:
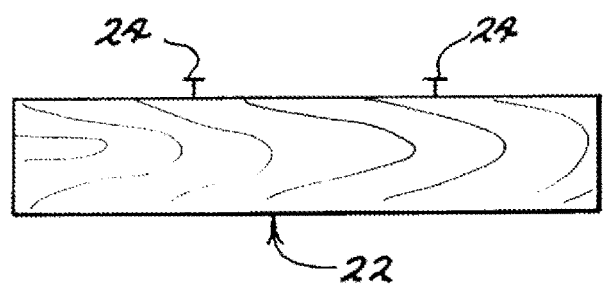
Figure 5C:
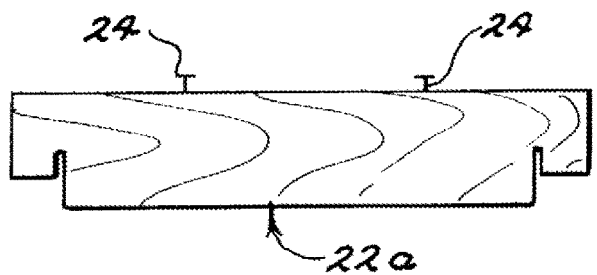

As illustrated in FIGS. 3 and 4, the prior art retention unit 10 is assembled by extending the outer frame structures 12 away from center frame structure 14 until the cross braces 18 on the top and bottom of the retention unit 10 are perpendicular to the center frame structure 14. In this position, mesh retention material 16a is no longer restrained within the retention unit 10. The mesh retention material 16a is centered and fastened to center frame structure 14 so that equal screen lengths can be extended in opposite directions from the center frame structure 14. When outer frame structures 12 are pivoted 180 degrees, they are in alignment with center frame structure 14 for the attachment of mesh retention material 16a.

Figures 6, 7:
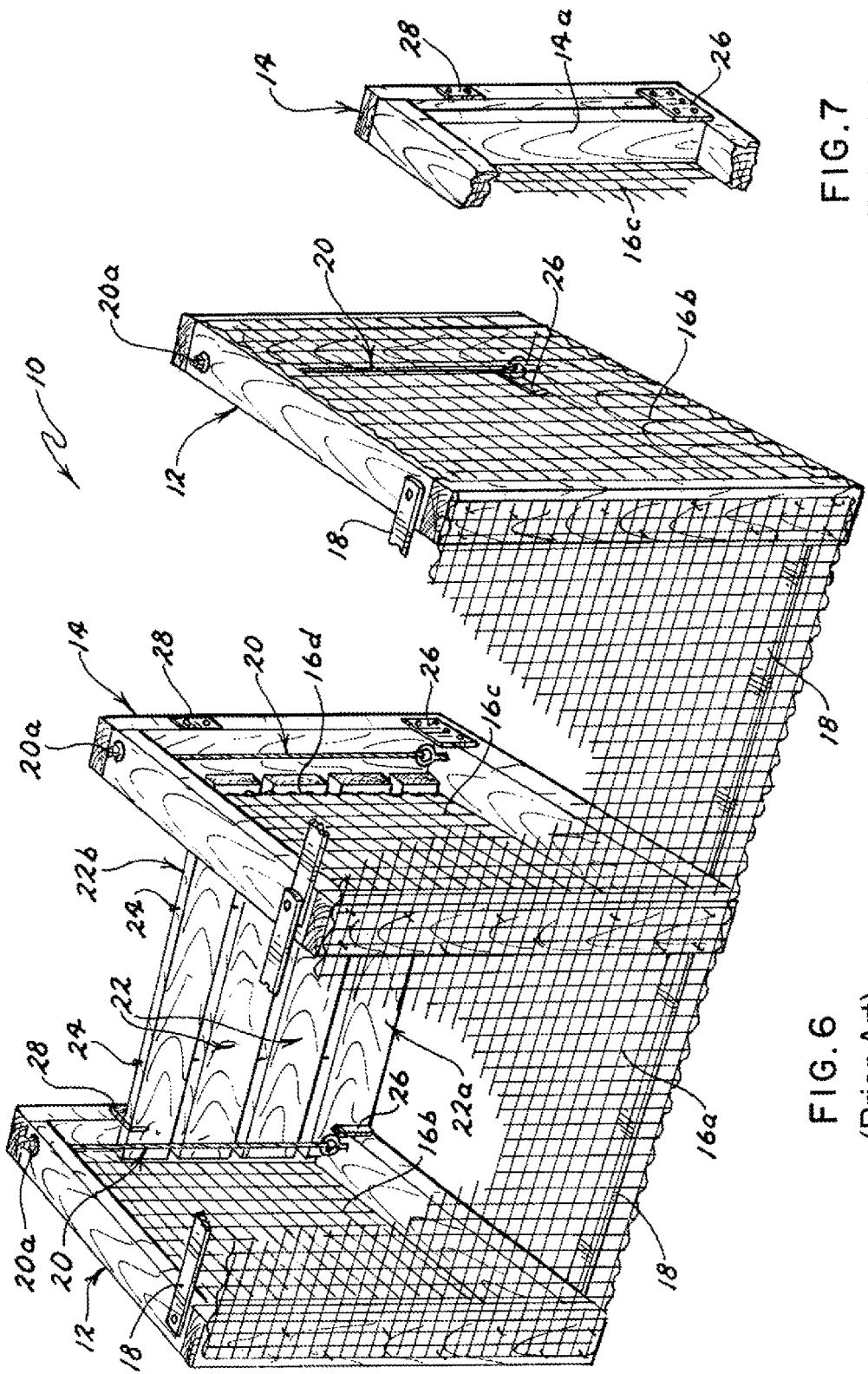
FIG. 6 is a perspective view from the back side of the fully-assembled prior art portable compost retention unit of FIG. 1a and illustrating an embodiment of a center frame structure.
FIG. 7 is a sectional view of a portion of the prior art portable compost retention unit of FIG. 1a, illustrating an alternate embodiment of center frame structure similar to that of FIG. 6.

As illustrated in FIGS. 5 and 6, opposite ends of the mesh retention material 16a are positioned to overlap the outer frame structure 12. In this position, mesh retention material 16a is fastened to outer frame structure 12. The mesh retention material 16a, 16b, and 16c encloses the retention unit 10 on three sides and with center frame structure 14 defines separate enclosures for the placement of organic materials. Multiple enclosures allows for efficient placement of organic materials according to stages of decomposition of the separate organic masses. A fourth side of the retention unit 10 allows access to organic materials as they are rotated, "turned", or removed. Removable containment slats 22 stacked vertically between frame structures 12 and 14 and internal wire restraints 20 provide a fourth wall of containment for separate enclosures. One or more containment slats 22 can be added or removed according to the height needed for containment of varying amounts of organic matter within the retention unit 10. Spacers 24 are fastened to the top of containment slats 22 to allow air to flow freely between containment slats 22 to the organic materials.

In retention unit 10, internal wire restraints 20 maintain the position of containment slats 22 inside the outer frame structures 12. However, the center frame structure 14 utilizes both internal wire restraint 20 and screen retention material 16c which is offset from center frame structure 14. This creates an opening in center frame structure 14 to accept and restrain containment slats 22. Offset screen retention material 16c is fastened to center frame structure 14 so that the unattached edge 16d of screen retention material 16c is aligned with the adjacent internal wire restraint 20. Both screen edge 16d and internal wire restraint 20 maintain the position of containment slats 22 in center frame structure 14.

As illustrated in FIG. 7, the center frame structure 14 can be constructed with an additional vertical support 14a. This additional vertical support 14a allows the previously unattached edge 16d of mesh retention material 16c to be firmly fastened to center frame structure 14. The vertical support 14a is connected to inside of center frame structure 14 so that it provides the opening necessary for maintaining internal position of containment slats 22. The vertical support 14a replaces both unattached edge 16d and the internal wire restraint 20 of center frame structure 14. This alternate construction increases frame support for mesh retention material 16c while decreasing the number of parts involved in the initial assembly. In other alternatives, metal rods may also be used in place of the wire restraints 20 of at outside frame structures 12; wire restraints 20 in outside frame structure 12 can be removed and metal rods inserted in their place. This approach further decreases the number of parts required and can avoid the adjustments to the tension of wire restraints 20.

In addition to allowing access to the front of the retention unit when desired, containment slats 22 contribute to the structural integrity of the retention unit 10, as illustrated in FIGS. 5-6. Bottom containment slats 22a interlock with outer frame structure 12 and center frame structure 14 at plates 26. The bottom containment slats 22a are altered on both lower corners to fit flush to the ground and to match the surfaces of frame structures 12 and 14. Containment slats 22a are also slotted to engage protruding plates 26. Containment slats 22a and plates 26 interlock to make a "gravity connection" between frame structures 12 and 14, but allow for easy removal of containment slats 22a to process or remove organic materials. Larger volumes of organic material increase outward pressure on frame structures 12 and 14. Containment slats 22b and plates 28 will also interlock to maintain upper stability and rigidity of the retention unit 10. Plates 28 can be rotated to a horizontal interlock position within slotted containment slats 22b to counteract the outward pressure of larger organic masses contained in the enclosures. They may also be returned to a vertical position on the side of frame structures 12 and 14 as containment slats 22b are removed.

Figure 8:
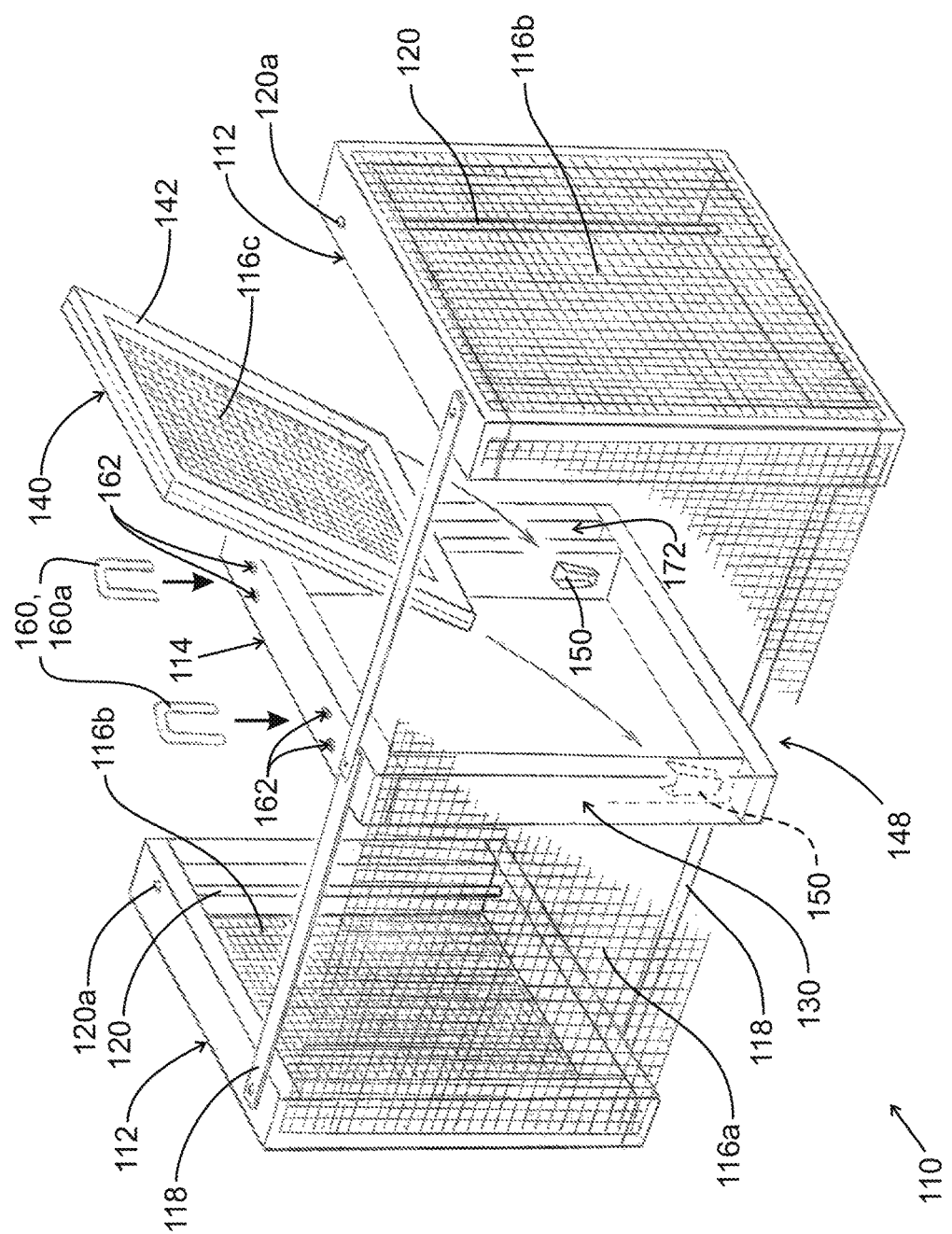
FIG. 8 is a perspective view from the back side of a portable compost retention unit with removable partition of the present invention, illustrating a removable partition removed from a center frame structure.
Figure 9:
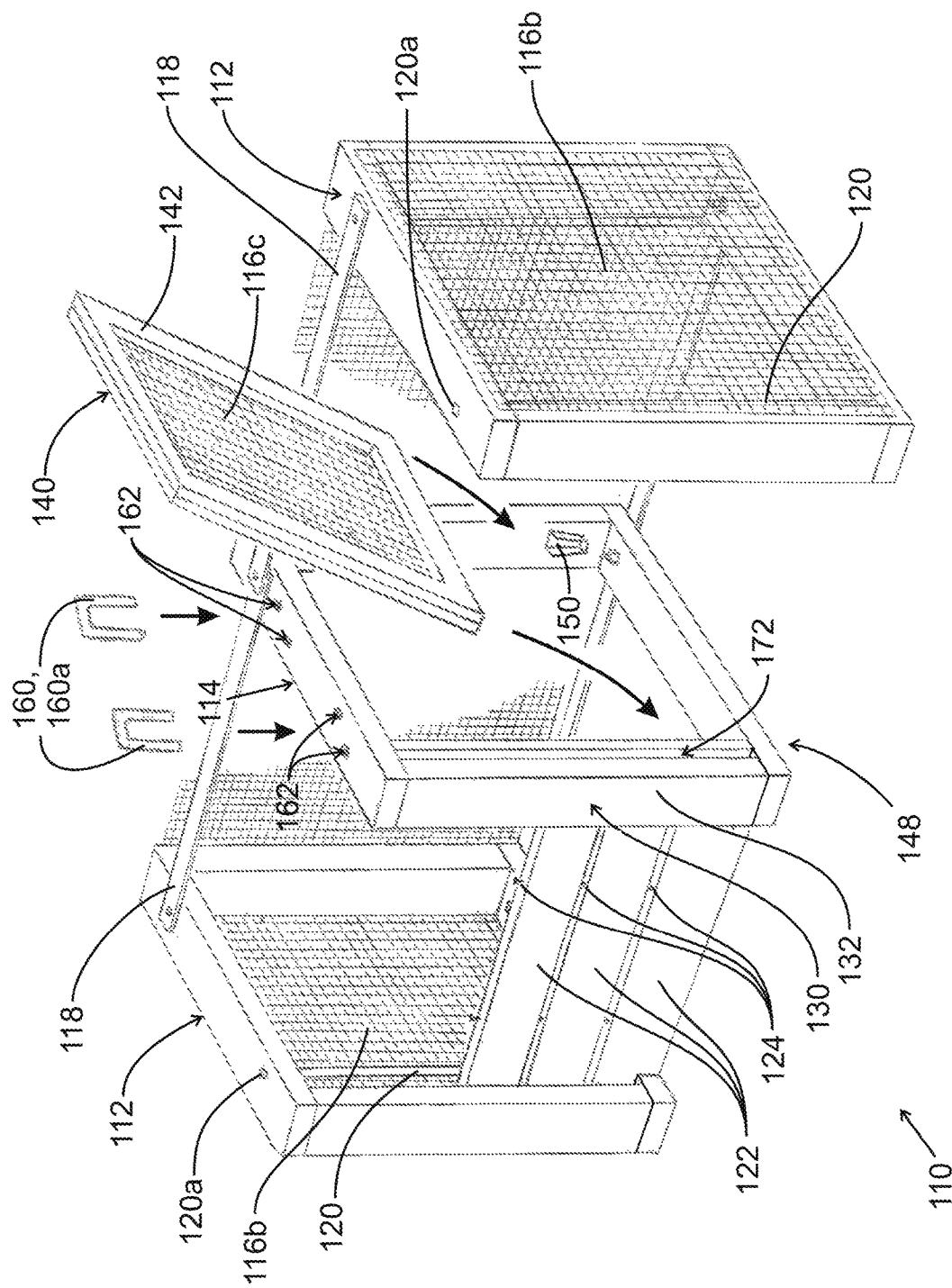
FIG. 9 is a perspective view from the front of the portable compost retention unit with removable partition of FIG. 9, illustrating the removable partition removed from the center frame structure.

Referring now to FIGS. 8-9, which are perspective views from the back side and from the front, respectively, of the portable compost retention unit with removable partition 110 (also referred to herein as compost retention unit or retention unit 110), showing a removable partition 140 removed from the center frame structure 114, two outer frame structures or first and second outer frame structures or end frames 112, an interconnected center frame structure 114, and mesh retention material 116a, 116b, 116c. The frame structures 112 and 114 are preferably pivotally attached to cross braces 118 on the top and bottom of the retention unit 110. Mesh retention material 116a, 116b, and 116c preferably encloses the retention unit 110 on three sides as shown and with center frame structure 114 defines separate enclosures for the placement of compost materials.

Containment slats 122 are removable and provide a fourth side for containment of the organic materials, compost, or other retained materials as follows. The removable containment slats or slats 122 stack vertically between frame structures 112 and 114 and slat retainers 170 provide a removable fourth wall of containment. Preferably, slats 122 extend to secure to the frame structures 112 and 114; preferably, one end of each slat 122 is captured between the frame structure 112 and an internal wire restraint 120, and the other end of each slat 122 is captured in a gap or opening 172 in the frame structure 114, with the slat retainers 170 preferably further securing the slats 122 in place. Preferably, slats 122 comprise wood framing material; more preferably, slats 122 comprise nominally 2×4 inch or 2×6 inch lumber resistant to moisture and rot, such as chemically-treated lumber or a naturally resistant variety of wood. Preferably, slat retainers 170 are simple and inexpensive hardware pieces such as screw eyes. The number of containment slats 122 can be chosen as desired according to the height necessary for containment of varying amounts of organic matter within the retention unit 110. Spacers 124 are fastened to the top of containment slats 122 to allow air to flow freely between containment slats 122 to the organic materials.

The portable compost retention unit with removable partition 110 is preferably shipped or stored in a partially assembled configuration similar to that illustrated in FIGS. 1a and 1b for the prior art portable compost retention unit 10. In the partially assembled configuration similar to that illustrated in FIGS. 1a and 1b, the mesh retention material 116a is enclosed within the retention unit 110 and is optionally secured to the center frame structure 114. In this configuration, the mesh retention material 116b is secured to the outer frame structures and covers the openings of outer frame structures 112, and removable partition 140, which comprises the mesh retention material 116c secured to a center screen frame 142, is secured to the center frame structure 114.

The retention unit 110 also includes internal wire restraints 120 located on the opposite side from attachment to the cross brace 118 as shown in FIG. 8. for example. Adjustment nuts 120a are preferably provided to engage each wire restraint 120; the adjustment nut 120a preferably protrudes above frame structures 112 to allow for adjustment of tension on internal wire restraints 120.

Preferably, the retention unit 110 unfolds to an extended configuration in a manner similar to that shown in FIGS. 2 and 3 for prior art portable compost retention unit 10, and the outer frame structures 112 pivot in a manner similar to that shown in FIG. 4 for prior art portable compost retention unit 10 to assemble the retention unit 110. Similar to the illustrations of FIGS. 2-4, in unfolding and assembling the retention unit 110, the outer frame structures 112 are extended away from center frame structure 114 until the cross braces 118 on the top and bottom of the retention unit 110 are perpendicular to the center frame structure 114. In this intermediate position, the mesh retention material 116a is no longer restrained within the retention unit 110. The mesh retention material 116a is centered and secured to the center frame structure 114 so that equal screen lengths extend in opposite directions from the center frame structure 114. When outer frame structures 112 are pivoted 180 degrees, they are in alignment with the center frame structure 114 for the attachment of the mesh retention material 116a. Referring now also to FIG. 8, opposite ends of the mesh retention material 116a are positioned to overlap the outer frame structure 112. In this position, the mesh retention material 116a is secured to outer frame structure 112. Preferably, the extended retention unit 110 can be collapsed to the partially assembled configuration by pivoting the interconnected elements and releasing the mesh retention material 116a.

The portable compost retention unit with removable partition or retention unit 110 provides multiple enclosures, allowing for efficient placement of organic materials according to stages of decomposition of the separate organic masses, and the containment slats 122 forming the fourth side of the retention unit 110 while providing maximized access to organic materials to facilitate rotating, "turning", or removal of the organic materials. In composting, this rotation of material from the top of the pile in one enclosure to the bottom of the pile in another enclosure provides for accelerated decomposition for the production enriched soil or humus. The removable partition 140 of the present invention provides useful advantages over the prior art. In particular, the removable partition 140 can be secured to the center frame structure 114 when it is desired to maintain separate organic masses or to contain organic materials in only one enclosure, yet the removable partition 140 can be removed from the center frame structure 114 when desired. Removal of the removable partition 140 provides for unencumbered transfer organic material from one enclosure to the other enclosure to facilitate rotation or "turning" of the organic material. Removal of the removable partition 140 avoids the need to withdraw organic material through the front of one enclosure and pass around a partition and into the second enclosure, or to lift the organic material over a fixed partition, by allowing a user to simply pass the organic material directly into the second enclosure with far less physical exertion than with the prior approaches.

In addition to helping to maintain the position of the containment slats 122 at the outer frame structures 112, internal wire restraints 120 provide additional structural integrity to the retention unit 110. Preferably, an adjustment nut 120a engages the wire restraint 120 and protrudes above frame structure 112 to allow for adjustment of tension on internal wire restraint 120.

Preferably, the center frame structure 114 includes a peripheral support structure 130 as shown in FIGS. 8 and 9, which provides support for the removable partition 140. Preferably, peripheral support structure 130 includes a peripheral support frame 132. Preferably, the center frame structure 114 also includes retention apparatus 148 for receiving and retaining the removable partition 140 and securing the removable partition 140 to the peripheral support structure 130. Preferably, the retention apparatus 148 includes lower retention members 150 as shown in FIGS. 8 and 9 to secure the removable partition 140 to the center frame structure 114. More preferably, the retention apparatus 148 includes a pair of lower retention member 150 as shown. Preferably, the lower retention members 150 are secured to the peripheral support structure 130. Preferably, the lower retention members 150 are configured to slideably receive the removable partition 140 to secure the removable partition 149 to the peripheral support structure 130. Preferably, the lower retention members 150 have openings which are larger at the top, allowing the removable partition 140 to tilt for placement into or removal from the center frame structure 114. Preferably, the retention apparatus 148 also includes upper retention members 160 as shown in FIGS. 8 and 9 to secure the removable partition 140 to the center frame structure 114; preferably, the retention apparatus 148 also includes corresponding upper securement structures such as holes or apertures 162 in the peripheral support structure 130 which hold the upper retention members 160 in place but allow for easy removal of the upper retention members 160 when it is desired to remove the removable partition 140 from the center frame structure 114. Preferably, to remove the removable partition 140 from the center frame structure 114, the upper retention members 160 are disengaged from the holes 162 and lifted upward, allowing the top of the removable partition 140 to tilt to the side, pivoting in the lower retention members 150. When the top of the removable partition 140 clears the top portion of the center frame structure 114, the removable partition 140 can be lifted up out of the lower retention members and removed from the retention unit 110. Thus, the removable partition 140 can be removed from the center frame structure 114 or alternatively secured to the center frame structure 114 when desired, to facilitate use of the retention unit 110. In FIGS. 8-9, arrows indicate that the bottom of the removable partition 140 can be inserted into the lower retention members 150, and arrows indicate that the upper retention members 160 can be inserted into the holes 162 to secure the upper portion of the removable partition 140 in the center frame structure 114. In some embodiments, the upper retention members 160 are pins such as U-shaped retention pins 160a. In some embodiments, the upper retention members 160 are pins such as straight retention pins 160b. Center frame structure 114 includes a peripheral support structure 130, including a peripheral frame 132 which includes an upper securement feature or hole(s) or aperture(s) 162 for engaging the upper retention member 160. Preferably, the peripheral support structure includes a plurality of apertures 162 for receiving the U-shaped retention pins 160a to engage the removable partition 140 when the removable partition 140 is engaged within the respective lower retention member(s) 150.

Preferably, the removable partition 140 is positioned between the two outer frame structures 112 when the removable partition 140 is engaged with the lower retention members 150.

Figure 10:
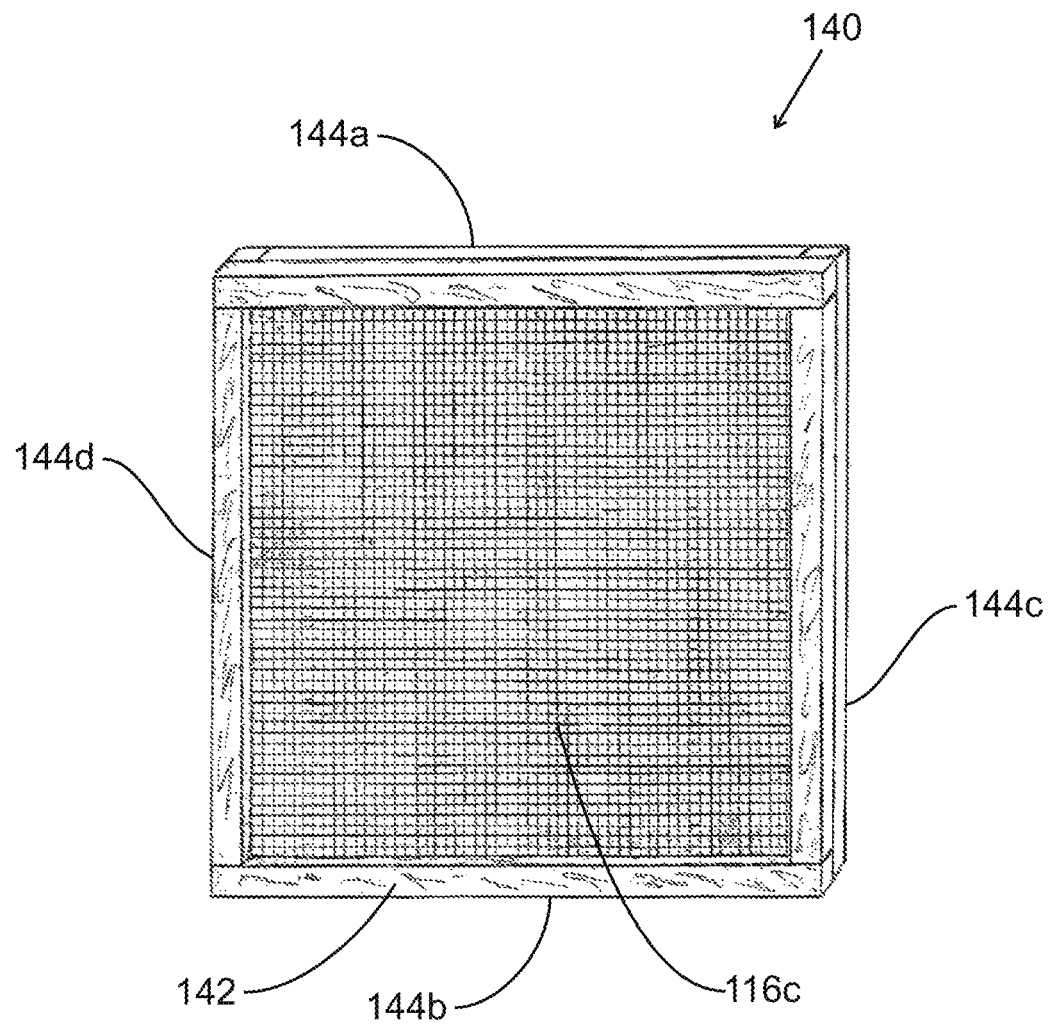
FIG. 10 is a side perspective view of the removable partition of FIG. 9.

FIG. 10 is a side perspective view of the removable partition 140, showing the mesh retention material 116c and the center screen frame 142. Preferably, the mesh retention material 116c is a screen material, although other structures with openings which allow air to flow freely through the mesh retention material 116c to the organic materials can be used. Preferably, the mesh retention material 116a, 116b, 116c are metal screen materials, although other configurations can be used, including polymeric or fabric screen material, metal fabric, hardware cloth, welded metal screen, poultry netting, fencing material, chain-link material, perforated sheet material, woven or knit material, fibrous mat material, filter-type material, and so forth; a combination of materials can be used, including multi-layer material or fiber reinforced material, such as a metal-reinforced polymeric mesh material, and so forth. The mesh retention materials 116a and 116b can be the same material as mesh retention material 116c, or they can be different materials; preferably, mesh retention materials 116a and 116b also comprise structures with openings which allow air to flow freely through the mesh retention material 116c to the organic materials can be used. In addition, mesh retention material 116a is preferably flexible or otherwise foldable to allow collapsing within the retention unit 110 in the collapsed and partially assembled configuration similar to that illustrated in FIGS. 1a and 1b for the prior art portable compost retention unit 10 and also to allow unfolding and assembly of the retention unit 110 in a manner similar to that illustrated in FIGS. 2-4 for the prior art portable compost retention unit 10. Preferably, the removable partition 140 is generally rectangular, having four perimeter sides 144a, 144b, 144c, 144d, with opposing perimeter sides having the same length, so that the removable partition 140 can be flipped top-for-bottom and secured to the center frame structure 114 in either orientation; this can extend the useful life of the removable partition as it is exposed to the moist and bacterially active compost pile. More preferably, the removable partition 140 is generally square, so that the removable partition 140 can be rotated secured to the center frame structure 114 with any of the four perimeter sides down; this can even further extend the useful life of the removable partition 140 as it is exposed to the moist and bacterially active compost pile, and also simplifies use since the removable partition 140 can be placed in the center frame structure 114 without regard to which perimeter side is oriented downward. Preferably, the partition 140 has two faces 146a, 146b (FIG. 11), and can be secured with either face oriented towards either outer frame structure 112. This can extend the useful life of the removable partition 140, and also simplifies use since the removable partition 140 can be placed in the center frame structure 114 without regard to which face is oriented towards which outer frame structure 112.

Figure 11:
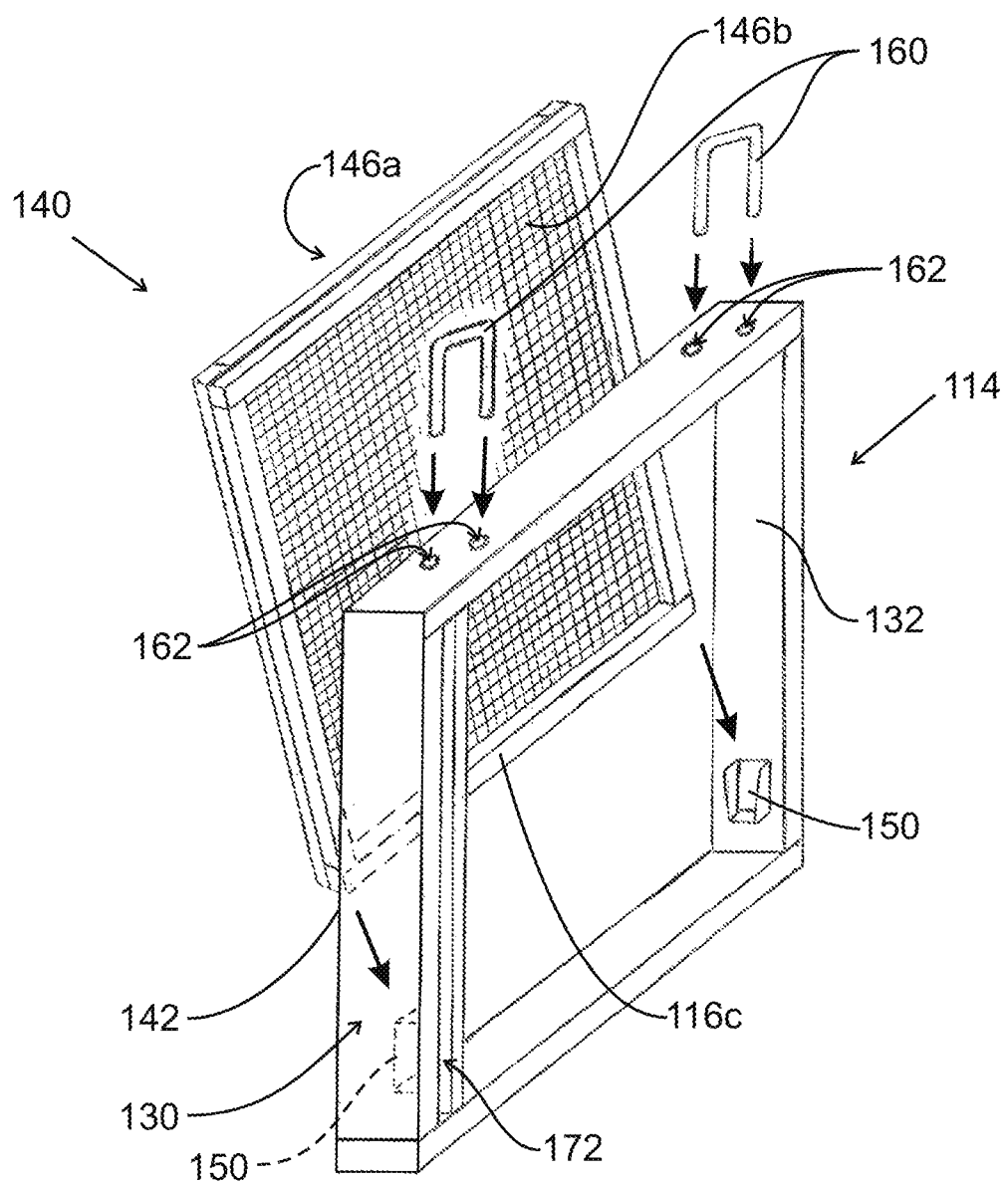
FIG. 11 is a front perspective view of a portion of the portable compost retention unit with removable partition of FIG. 9, illustrating the removable partition removed from the center frame structure, and showing lower retention members into which the removable partition can be placed and upper retention members which secure the removable partition to the center frame structure.

FIG. 11 is a front perspective view of a portion of the portable compost retention unit with removable partition 110, further illustrating the removable partition 140 removed from the center frame structure 114, and showing lower retention members 150 into which the removable partition 140 can be placed and upper retention members 160 and holes 162 into which the upper retention members 160 can be placed to secure the removable partition 140 to the center frame structure 114. In FIG. 11, lines indicate that the upper retention members 160 are shown aligned with the holes 162 to facilitate the insertion and removal of the upper retention members 160 into and from, respectively, the holes 162, and lines indicate that the bottom of the removable partition 140 is shown aligned with the lower retention members 150 to the facilitate insertion and removal of the removable partition 140 into and from, respectively, the lower retention members.

Figure 12:
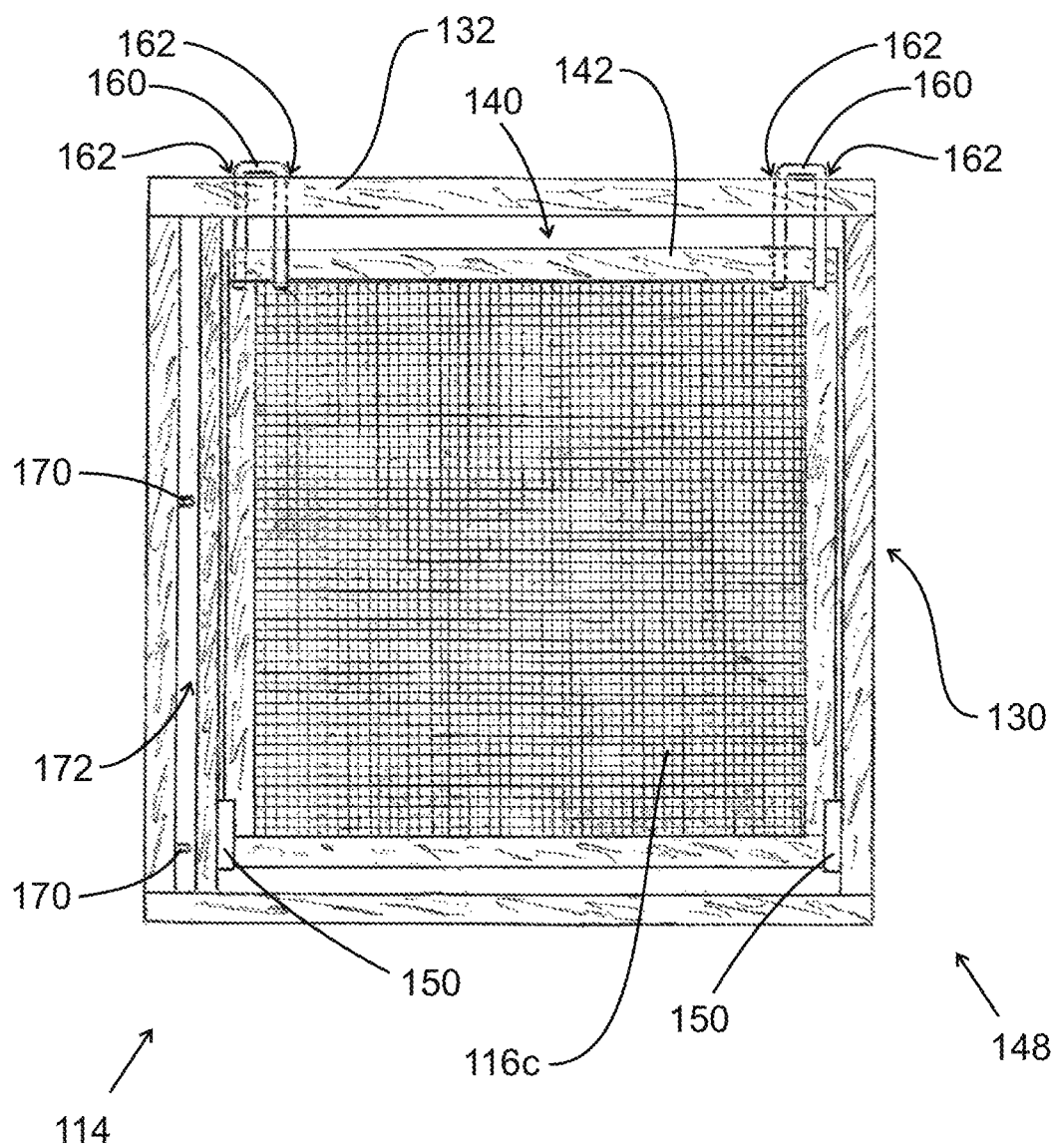
FIG. 12 is a side view of a portion of the portable compost retention unit with removable partition of FIG. 9, illustrating the removable partition secured to the center frame structure and retained by the lower retention members and the upper retention members.

FIG. 12 is a side view of a portion of the portable compost retention unit with removable partition 110, illustrating the removable partition 140 secured to the center frame structure 114 and retained by the lower retention members 150 and the upper retention members 160. Preferably, the upper retention members 160 each have a portion which passes through holes 162 in the center frame structure 114. Preferably, the upper retention members 160 each have a portion which can be located on each side of the removable partition 140 as shown, to prevent the removable partition from tilting out of the center frame structure 114 in either direction when the upper retention members 160 are in place securing the removable partition 140 to the center frame structure 114. The gap or opening 172 and the slat retainers 170 are also seen, which provide for securement of the containment slats 122 to the retention unit 110 to enclose the organic material.

Figure 13:
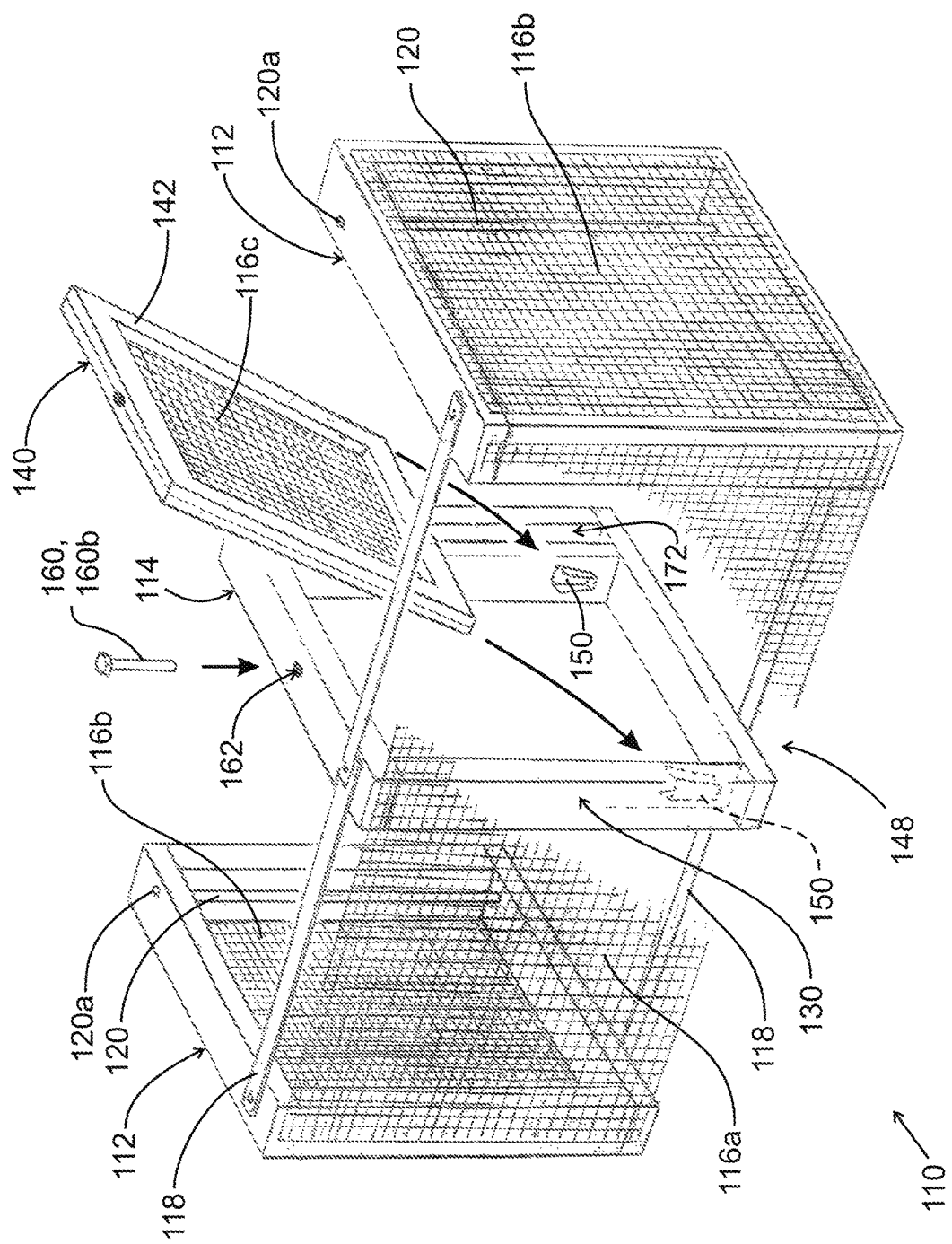
FIG. 13 is a perspective view from the rear of an alternative portable compost retention unit with removable partition similar to that of FIG. 9, but with an alternative upper securement apparatus including a pin, and illustrating the removable partition removed from the center frame portion.
Figure 14:
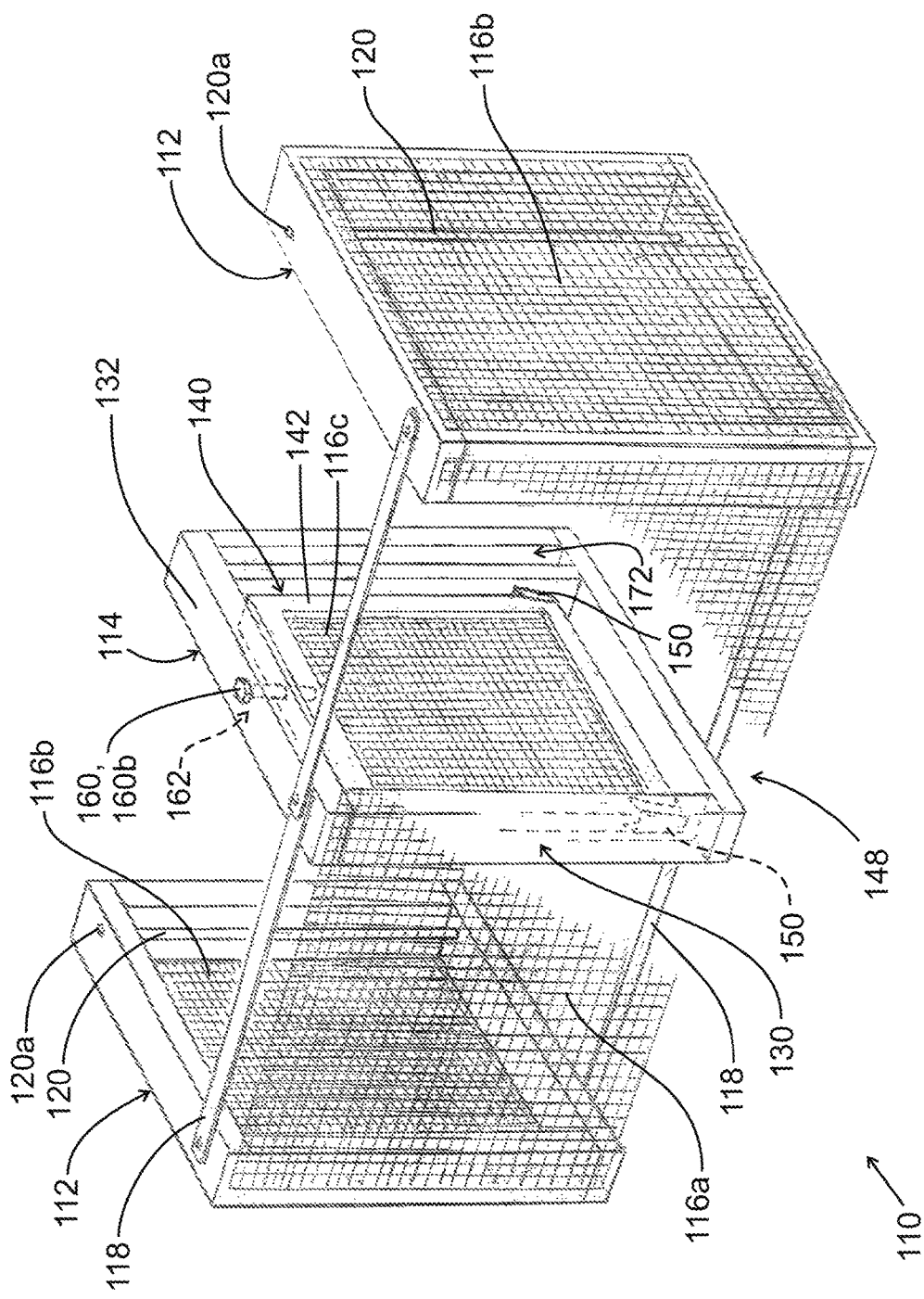
FIG. 14 is a perspective view from the rear of the portable compost retention unit with removable partition similar of FIG. 13, but illustrating the removable partition secured to the center frame portion.

FIG. 13 is a rear perspective view similar to that of FIG. 8, but showing alternative upper retention member 160 which are straight retention pins 160b. In this view, the removable partition 140 is shown removed from the peripheral support structure 130. The peripheral support structure 130 includes a peripheral frame 132 which includes an upper securement feature or hole or aperture 162 for engaging the upper retention member 160. FIG. 14 is a view similar to that of FIG. 13, but showing the removable partition 140 secured by the retention apparatus 148. In FIG. 14, the straight retention pins 160b are shown engaging the removable partition 140 and engaging the holes 162 to secure the removable partition 140 to the retention unit 110.

While numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A compost retention unit for easy assembly to retain compost or other retained materials when the unit is fully assembled upon a generally flat surface, the compost retention unit comprising:
 a plurality of interconnected frame structures, the plurality of interconnected frame structures including first and second outer frame structures, a removable partition and a center frame structure; wherein the center frame structure includes a frame and a retention apparatus for retaining the removable partition; wherein the retention apparatus includes a retention member for receiving and retaining the removable partition such that the removable partition can be surrounded on all sides by the frame when it is retained within the frame; wherein the retention member has an opening at a top of the retention member that narrows as it extends away from the top so that the removable partition can tilt for placement into or removal from the center frame structure when engaged within the retention member.

2. The compost retention unit of claim 1, wherein the retention apparatus includes a pair of lower retention members and the center frame structure includes a peripheral support structure to which the lower retention members are secured.

3. The compost retention unit of claim 2, wherein the retention apparatus includes a retention pin which can engage the removable partition when the removable partition is engaged within the respective lower retention members.

4. The compost retention unit of claim 3, wherein the peripheral support structure includes a peripheral frame to which the respective lower retention members are secured;

wherein the peripheral frame includes an aperture for receiving the retention pin in such a manner that enables the retention pin to engage the removable partition when the removable partition is engaged within the respective lower retention members.

5. The compost retention unit of claim 4, wherein the retention pin is a U-shaped retention pin and the peripheral frame includes a plurality of apertures for receiving the U-shaped retention pin in such a manner that enables the U-shaped retention pin to engage the removable partition when the removable partition is engaged within the respective lower retention members removable partition.

6. The compost retention unit of claim 1, wherein the removable partition includes a mesh retention material.

7. The compost retention unit of claim 6, wherein the mesh retention material is a metal screen.

8. The compost retention unit of claim 2, wherein the removable partition is positioned between the two outer frame structures when the removable partition is engaged within the respective lower retention members.

9. The compost retention unit of claim 1, wherein the plurality of interconnected frame structures are pivotally interconnected so that the compost retention unit can be collapsed to a storage configuration and expanded from the storage configuration to an assembled configuration.

10. The compost retention unit of claim 1, wherein the center frame structure includes a peripheral support structure and at least one lower retention member secured to the peripheral support structure, and wherein the removable partition slides into a portion of the at least one lower retention member to secure the removable partition to the peripheral support structure.

11. A compost retention unit for easy assembly to retain compost or other retained materials when the unit is fully assembled upon a generally flat surface, the compost retention unit comprising:
a plurality of interconnected frame structures, the plurality of interconnected frame structures including two outer frame structures, a removable partition and a center frame structure; wherein the center frame structure includes a peripheral support structure and a retention apparatus for receiving and retaining the removable partition; wherein the retention apparatus includes a pair of lower retention members, wherein each lower retention member has an opening at a top of the lower retention member that narrows as it extends away from the top so that the removable partition can tilt for placement into or removal from the center frame structure when engaged within the respective retention member, and the center frame structure includes a peripheral support structure to which the lower retention members are secured.

12. The compost retention unit of claim 11, wherein the retention apparatus includes a retention pin which can engage the removable partition when the removable partition is engaged within the respective lower retention members.

13. The compost retention unit of claim 12, wherein the peripheral support structure includes a peripheral frame to which the respective lower retention members are secured; wherein the peripheral frame includes an aperture for receiving the retention pin in such a manner that enables the retention pin to engage the removable partition when the removable partition is engaged within the respective lower retention members.

14. The compost retention unit of claim 13, wherein the retention pin is a U-shaped retention pin and the peripheral frame includes a plurality of apertures for receiving the U-shaped retention pin in such a manner that enables the U-shaped retention pin to engage the removable partition when the removable partition is engaged within the respective lower retention members removable partition.

15. The compost retention unit of claim 11, wherein the removable partition includes a mesh retention material.

16. The compost retention unit of claim 15, wherein the mesh retention material is a metal screen.

17. The compost retention unit of claim 11, wherein the removable partition is positioned between the two outer frame structures when the removable partition is engaged within the respective lower retention members.

18. The compost retention unit of claim 11, wherein the plurality of interconnected frame structures are pivotally interconnected so that the compost retention unit can be collapsed to a storage configuration and expanded from the storage configuration to an assembled configuration.

19. A method of retaining compostable material within a compost retention unit, the method comprising the steps of:
providing a compost retention unit having a plurality of interconnected frame structures, the plurality of interconnected frame structures including first and second outer frame structures, a removable partition and a center frame structure; wherein the compost retention unit includes first and second compost retention portions where compostable material can be retained for a period of time; wherein the first and second compost retention portions are at least partially surrounded by the interconnected frame structures and separated from one another by the removable partition; wherein the center frame structure includes a retention apparatus for receiving and retaining the removable partition including two retention members having openings for receiving the removable partition that are wider at the top than the openings are as the openings extend away from the top;
placing compostable material in at least the first compost retention portion;
removing the removable partition from the peripheral structure;
transferring the at least a portion of the compostable material from the first compost retention portion to the second compost retention portion; and
inserting the removable partition in the peripheral support structure.

20. The method of claim 19, wherein the removable partition is rectangular and has a first and a second side which are configured so that either of the first or second side can be oriented downward when the removable partition is secured within the peripheral support structure, and the method further includes the step of orienting the removable partition with the first side oriented downward prior to the step of removing the removable partition from the peripheral structure, and the step of replacing the removable partition and securing the removable partition to the center frame further comprises the step of orienting the removable partition with the second side oriented downward.

* * * * *